Jan. 13, 1942.  R. D. MacDONALD  2,269,980
MOWER
Filed June 23, 1939   4 Sheets-Sheet 1

Inventor
R. D. MacDonald
By Paul O. Pippel
Atty.

Jan. 13, 1942. R. D. MacDONALD 2,269,980
MOWER
Filed June 23, 1939 4 Sheets-Sheet 4

Inventor
R. D. MacDonald
By Paul O. Pippel
Atty.

Patented Jan. 13, 1942

2,269,980

UNITED STATES PATENT OFFICE 2,269,980

MOWER

Raymore D. MacDonald, Western Springs, Ill., assignor to International Harvester Company, a corporation of New Jersey Application June 23, 1939, Serial No. 280,736

17 Claims. (Cl. 56—25)

This invention relates to a mower, and more particularly to a drive coupling means for a mower attachment of the tractor connected type, the improved drive coupler being established between the tractor power take-off shaft and a shaft on the mower operating the mower cutting mechanism.

The invention contemplates improvements in drive coupling means especially for mowers for the tractor connected type, of which there are generally two classes. In one class, the mower is mounted directly on the tractor and is carried by a support which may be in the form of the tractor draw-bar. In the other class, the mower includes a frame which is connected at its forward end to the draw-bar and at its rearward end is supported by a ground-engaging means in the form of a caster wheel or the like. In both classes of mowers, the cutting mechanism is releasable from the mower for rearward swinging movement horizontally about a vertical axis when the cutter bar strikes an obstruction. In either construction, it is desirable to provide a drive means between the tractor power take-off shaft and the cutting mechanism that may be readily released as the cutter bar swings rearwardly. In general, it may be said that both the tractor-mounted and the tractor-connected mowers utilize similar drive means. In former constructions whether the mower was of the tractor-mounted or tractor-connected type, no adequate provision was made for automatically recoupling the drive means after the cutter bar had been released by striking an obstruction; generally, it was necessary for the operator to dismount from the tractor and to recouple the driving connections by hand. Such recoupling driving connections as were provided formerly were complicated by the apparent necessity of resorting to universal joints and other expensive coupling means in order to attain the requisite flexibility.

The principal object of the present invention is to provide an improved drive coupling means for establishing driving connection between the tractor power take-off shaft and the mower shaft, which is connected to the mower cutting mechanism.

An important object is to provide the drive coupling means of flexible construction, so that, in either the tractor-mounted or the tractor-connected mowers, it is easily releasable and easily and automatically recoupled by backing the tractor toward the released mower; and, in a tractor-connected type of mower, the flexible drive coupling means eliminates expensive jointed shafts and permits free floating movement of the mower frame within the necessary limits as the tractor and mower caster wheel follow the contour of the ground.

Another important object is to provide an improved drive coupling means which, in either type of mower, is flexible to compensate for irregularities in manufacture and twisting strains developed during operation of the mower, whether the mower main frame be rigid as respects vertical movement in relation to the draw-bar, or whether it is capable of free floating vertical movement within limits, as in the tractor-connected mower having a rearwardly extending frame supported at its rear end on a caster wheel or the like.

Another important object is to provide a drive coupling means of flexible construction, which, when the mower is released, is resiliently supported in an extended position toward and in alinement with either the tractor power take-off shaft or the mower driving shaft, depending upon which shaft carries the coupling means.

Another object is to provide a coupling means in the form of a coil spring carried at one end by either the tractor power take-off shaft or by the mower drive shaft for rotation therewith, and releasably engaged at its other end with the other shaft.

Another object is to provide means for guiding the disengageable end of the coupling means into reengagement with the necessary driving shaft.

Another object is to provide a simplified guiding means consisting of an enlarged disk having a reduced drive portion thereon for engaging the drive portion on the engageable end of the coupling means, wherein the face of the disk is provided with a spiral path or track leading to the drive portion on the disk, so that the coupling means may be readily and quickly engaged with the drive portion on the disk, regardless of the point at which it contacts the disk during reconnection of the mower with the tractor.

Briefly and specifically, these and other important objects are attained in one preferred form of the invention in which the coupling means is utilized in connection with a mower of the tractor-mounted type; that is, a mower attachment which is rigidly carried by a support or draw-bar secured to the tractor, and which has no designed vertical movement with respect to the tractor or draw-bar, the only movement being that in a rearward direction horizontally about a vertical axis on the draw-bar when the cutter bar strikes an obstruction. The importance of the improved flexible drive coupling in this instance lies in the fact that the resiliency of the coupler permits some latitude between the tractor power take-off shaft and the mower drive shaft as caused by irregularities in manufacture. Of equal importance is the fact that the flexible drive coupling means compensates for misalinement of the shafts caused by twisting strains developed during operation of the tractor mower. A preferable type of drive coupling means, according to the present invention, consists of a driving disk carried by the tractor power take-off shaft for rotation therewith. The mower includes a supporting structure carried by the tractor draw-bar and journaling a mower drive shaft substantially in alinement with the tractor power take-off shaft. A coil spring is attached at one end to the mower drive shaft and is carried thereby for rotation therewith, having at its other end a disengageable drive portion which is engageable with and releasable from a complementary drive portion located centrally in the driving disk carried by the power take-off shaft. The drive portions are considerably smaller than the diameter of the drive disk, and the face of the disk is concave for permitting association between the drive portions when the tractor and mower are reconnected. To further augment the ready connection between the drive spring and the drive disk, the latter is formed with a spiral path or groove leading from the periphery of the disk toward its central drive portion, whereby the spring drive portion is urged quickly and easily into engagement with the disk drive portion, regardless of possible slight misalinement of the parts when the tractor and mower are reconnected.

A more complete understanding of the objects and desirable features of the invention may be had from the following detailed description taken in conjunction with the accompanying sheets of drawings illustrating a preferred type of drive coupling means utilized in connection with a mower of the tractor-mounted type.

Figure 1:
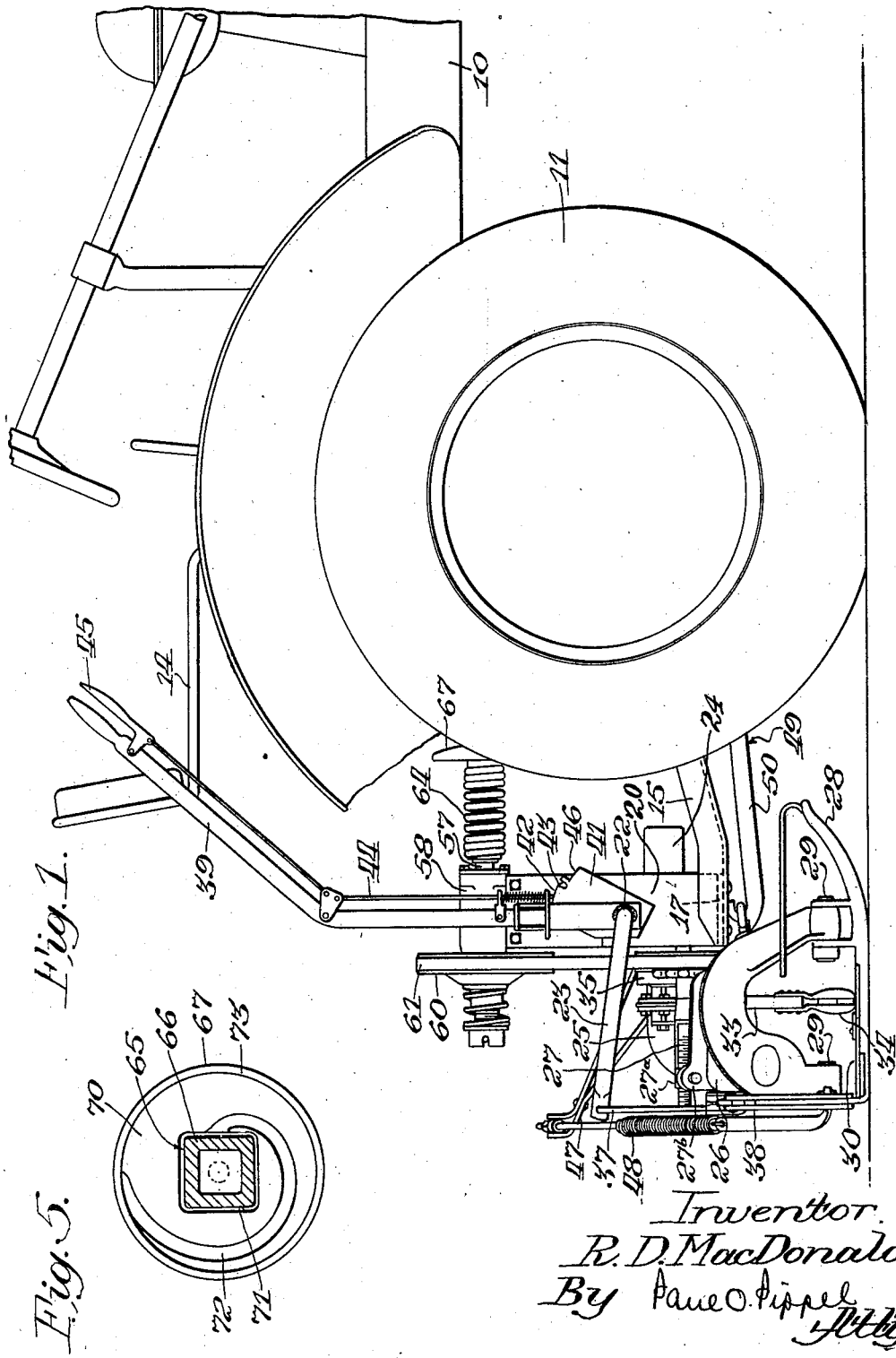
Figure 1 is a side elevational view of the tractor and mower attachment.

As previously mentioned, the mower attachment chosen for the purposes of illustrating the present invention is of the tractor-mounted type utilized in conjunction with a tractor which includes a main frame 10 supported at its rear by a pair of wheels 11, between which the frame 10 includes a transmission and drive gearing housing 12, from which a longitudinal power take-off shaft 13 extends rearwardly. The particular tractor illustrated is of the type having its main frame offset at one side with respect to the true center line of the tractor as considered in relation to the wheel tread. An operator's seat 14 is suitably carried by the main frame 10 in a position from which the operator may easily guide the tractor.

The tractor rigidly carries at the rear thereof a support which may be in the form of a draw-bar 15 secured at its forward ends to a depending housing portions 16 comprising part of the rear axle structure of the tractor main frame 10. The particular draw-bar is of the type commonly referred to as a U-bar, and includes a horizontally disposed, transversely extending cross member 17, on which the mower attachment is directly mounted.

Figure 2:
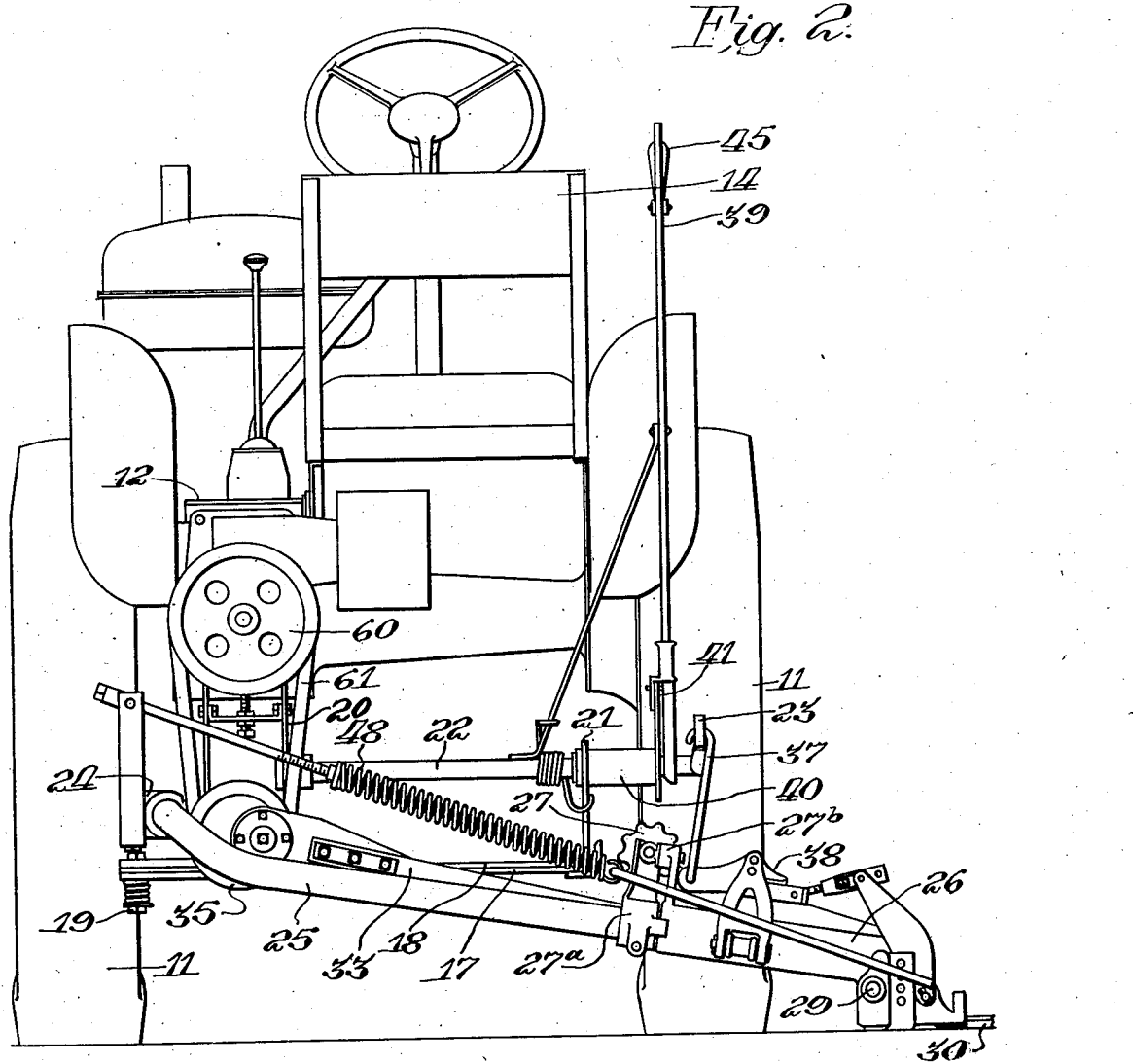
Figure 2 is a rear elevational view of the same.

A preferred type of mower attachment comprises a mower frame including a transverse member 18 pivotally carried at its stubbleward end by the transverse member 17 of the support or draw-bar 15. The pivotal connection is in the form of a resiliently mounted pivot member 19 disposed on a vertical axis at the left side of the tractor draw-bar, as viewed from the rear looking toward the front, as best shown in Figure 2. The connection 19 may be in any form, and the particular construction illustrated is no part of the present invention. As shown, the connection consists of a headed bolt passed through the members 17 and 18, through the coil spring, and provided with a nut. The mower frame member 18 rigidly carries adjacent its left hand end a vertically extending supporting bracket 20, and at its right hand end a bracket or support 21. A rock-shaft 22 is journaled at one end in the support 20, passing through the support 21 and being formed at its right hand or grassward end with a rearwardly extending crank arm portion 23. This rock-shaft comprises part of the lifting mechanism, which will be described later. The transverse mower frame 18 has rigidly disposed thereon, to the left of the support 20, a journal bracket 24, in which is journaled the longitudinally extending end of a coupling bar 25, which further includes an integral, transversely extending portion comprising a principal part of the mower construction. The coupling bar or member 25 is thus pivoted on a horizontal, longitudinal axis in the journal bracket 24 for vertical movement.

The cutting mechanism of the mower is carried at the grassward end of the coupling bar 25 and comprises a coupling yoke 26. This yoke is preferably rockably and adjustably carried by the bar 25, adjustment being provided by a hand screw mechanism 27, which includes an arm 27a rigidly carried by the coupling bar and associated through a hand screw adjusting means with a portion 27b of the coupling yoke 26. The adjustment provides for varying the angle of the yoke 26 and a mower shoe 28, the shoe being further pivotally or rockably carried by the coupling yoke 26 about a pair of coaxial pins 29 constituting a horizontal, longitudinal axis. A cutter bar 30 extends transversely at the grassward side of the shoe 28 and is provided with a conventional knife 31, which is associated in the usual manner with guards 32. The knife 31 is reciprocated in the usual manner through the medium of a drive pitman 33 connected at one end to a knife-head 34 and extending transversely across the mower structure and connected at its other end to a combined pulley and driving eccentric 35 carried on a shaft 36 journaled in a lower portion of the support member 20, which is carried by the transverse frame member 18. A shield 18a is disposed ahead of the member 18 to prevent accumulation of grass, etc., from interfering with the pitman drive parts. The pivotal connection between the coupling bar 25 and the supporting bracket 24 permits the cutting mechanism to have free floating movement vertically within limits as the shoe 28 follows the ground contour. The pivotal connection formed by the pins 29 between the shoe 28 and the coupling yoke 26 permits to some extent further free movement of the cutting mechanism and provides also a pivot about which the cutter bar may be raised when lifted to transport position by a lifting mechanism, which will be presently described.

The rearwardly extending crank arm 23 of the rockshaft 22 referred to above is connected at its rearward end by a link 37 to lifting linkage 38 pivotally associated with the coupling yoke 26. The linkage is further connected to the rearward end of the mower shoe 28, and the rock-shaft 22 is rigidly associated with a lifting lever 39, which extends upwardly and forwardly from the shaft to within easy reach of the operator's seat or station 14. The vertical support 21, at the grassward end of the transverse frame member 18, further includes a rigid sleeve member 40, on which is rigidly mounted a lifting quadrant or sector 41. It will be understood that the rock-shaft 22 is rockable with respect to the sleeve 40 and the quadrant 41. The quadrant is preferably formed with a detent-engaging surface 42 uninterrupted except by the provision of a single notch 43 engageable by detent or latch mechanism 44 controlled by a hand latch member 45 disposed at the upper end of the lifting lever 39. The relation between the detent mechanism 44 and the quadrant 41 is such that the cutting mechanism may have considerable free floating movement without causing engagement of the detent mechanism 44 with the notch 43, the lower end of the detent mechanism riding freely over the uninterrupted surface 42 of the quadrant 41. The quadrant is further provided with a cut-out portion 46 at its forward upper end, which is engaged by the detent mechanism 44 when the cutter bar is raised to transport position. A rearwardly extending bracket or supporting member 47 is rigidly secured to the extreme left hand end of the transverse frame member 18 and at its rearward end is connected to a lifting spring mechanism 48, associated between the bracket 47 and the lifting linkage 38.

In the normal cutting position of the mower attachment, the transverse frame member 18 is substantially coincident with the transverse member 17 of the draw-bar 15, the mower structure being held in this normal position through the medium of a releasable connecting means 49 connected between the coupling yoke 26 and the draw-bar 15. When this means is released because of the striking of an obstruction by the cutter bar 30, the mower attachment swings horizontally rearwardly from the tractor about the vertical pivot 19 which establishes the pivotal connection between the transverse member 18 and the draw-bar 15. The releasable means 49 preferably comprises a pair of substantially longitudinally extending bars 50 and 51 arranged in telescopic relation, as more completely disclosed in assignee's copending application, Serial No. 280,734, filed June 23, 1939. The bar 51 is carried at its forward end by the draw-bar 15 and includes thereat a comparatively resilient latch or hook member 52 having an inner inclined surface 53 disposed at substantially less than a 90 degree angle to the inner face of the bar 51. The forward end of the bar 50 is provided with a latch or engageable portion 54 formed with an inclined face or surface 55, which, when engaged with the member 52, is complementary to the surface 53. The resiliency of the member 52 provides for maintaining engagement between the surfaces 53 and 55 sufficient to overcome normal operating strains and to prevent release of the mower structure from the tractor. The engagement between the members 50 and 51, however, is interrupted and the mower is released from the normal cutting position for rearward swinging movement horizontally about the pivot 19 when the cutter bar 30 strikes an obstruction. The releasable means 49 is of the type limiting the rearward swinging movement of the mower, and complete disconnection between the mower and tractor is not effected except under extreme circumstances. The bar 51 includes at its rearward end a stop member 56, which is engageable by the latch or engageable portion 54 on the member 50 when the mower is released and reaches its limited rearward movement. The provision of this means 49 provides for reconnecting the tractor and mower by backing the tractor toward the mower; it is not necessary for the operator to dismount from the tractor, as the reconnection is made automatically.

The foregoing description pertains to a preferred type of mower attachment of the tractor-mounted type, and the following description will pertain to a particular type of improved drive coupling means, according to the present invention, especially adapted to the aforesaid type of mower attachment. It will be understood, of course, that the drive coupling means or various modifications thereof may be utilized in conjunction with other types of mowers, as, for instance, the tractor-connected type hereinabove referred to.

As previously mentioned, the support 20, which is carried by the transverse frame member 18 of the mower, serves to journal the longitudinal shaft 36, which, through the pulley and eccentric 35, drives the pitman 33. A second shaft 57 is journaled on bearings 57a in an upper housing portion 58 of the support 20, the shaft being disposed vertically above and parallel to the pitman drive shaft 36. The housing 58 is adapted to contain lubricant for lubricating the bearings 57a, and the housing is filled or drained through the removable plugs 58a. The shaft 57 is further substantially in alinement with the power take-off shaft 13 of the tractor. The shaft 57 extends forwardly and rearwardly of the housing and on its rear extending portion is associated with a slip clutch 59, which, in turn, is operably associated with a large pulley 60. A drive belt 61 is trained about this pulley and about the pitman drive eccentric and pulley 35 for establishing driving relation between the shaft 57 and the mower cutting mechanism.

Figure 4:
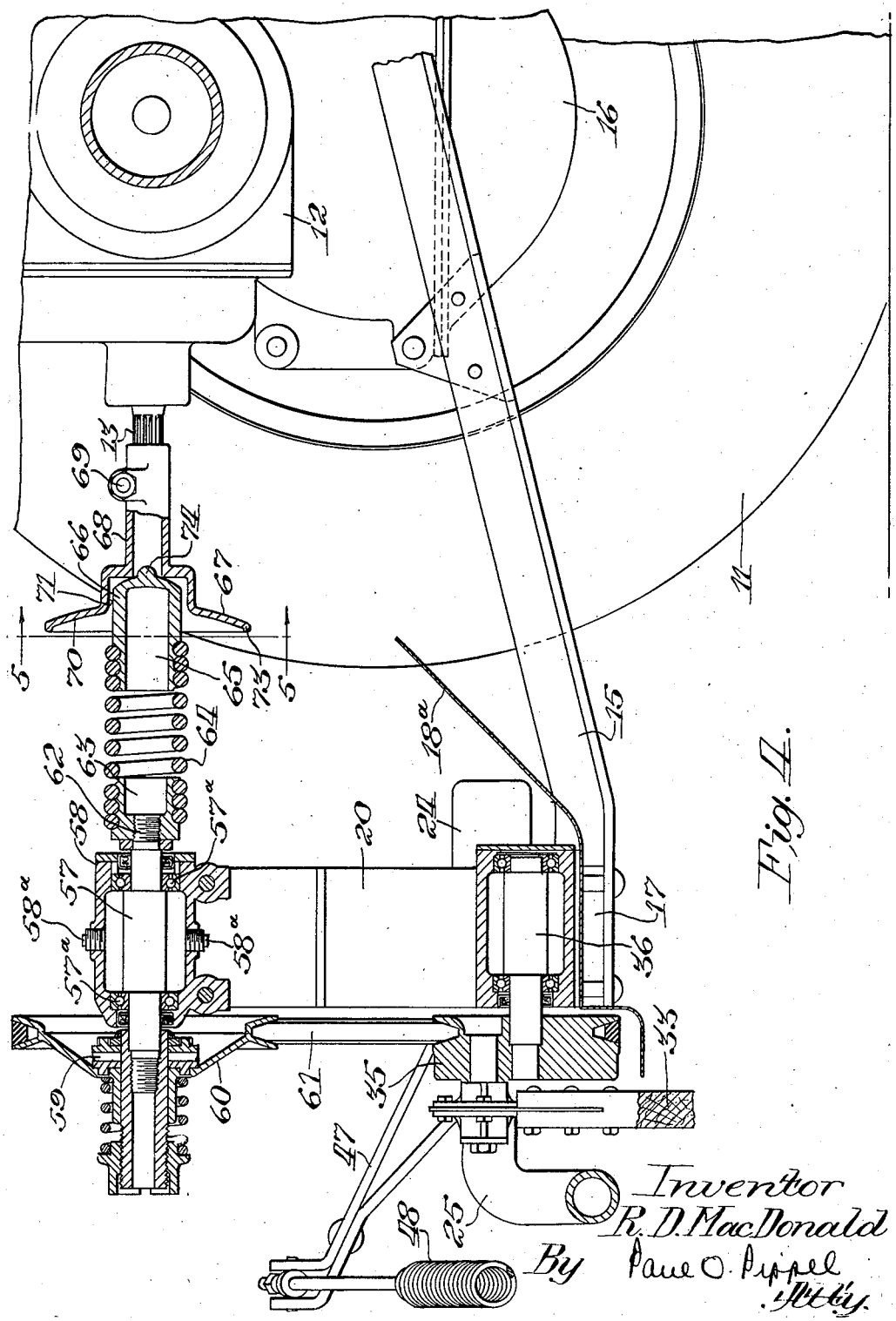
Figure 4 is an enlarged side elevational view of the mower construction, partly in section, illustrating a preferred embodiment of the drive coupling means; and, Figure 5 is a rear sectional view taken on the line 5—5 of Figure 4, illustrating the relation between the drive disk and the coupling drive member.

The portion of the shaft 57 which extends forwardly of the housing 58 on the support 20 is connected to a coupling member which comprises a component part of the improved drive coupling means for establishing driving relation between the tractor power take-off 13 and the mower drive shaft 57. This forward end of the shaft 57 is threaded at 62 and receives thereon a threaded member 63, which is formed with a spirally curved periphery adapted to rigidly carry one end of a coupling member in the form of a large coil spring 64. In this manner the coupling member or coil spring 64 is carried at its rear end by the forward end of the shaft 57 for rotation therewith. The forward end of the coupling member or spring 64 has fitted therein a drive member 65 formed with a spline driving portion 66, which in this instance is substantially square in cross section, as best shown in Figure 5. The member 65 is formed with a spirally curved periphery, thus simulating a screw or threaded portion, which fits in the first few turns of the forward end of the spring 64, being thus adapted to rotate with the spring. The coils of the spring 64 are wound preferably clockwise, as viewed from the rear of the tractor, the power take-off shaft 13 also turning clockwise. The improved drive coupling means further includes a driving member in the form of a disk 67 carried by and for rotation with the power take-off shaft 13 through the medium of an integral sleeve 68 formed on the disk. The sleeve 68 is preferably split and is tightened in position on the shaft 13 by means of a bolt 69, the disk member being thus removable from the shaft 13 when it is desirable to use the tractor for other purposes. The disk body 67 includes a concave radial face 70 disposed toward the rear or toward the mower. The disk further includes a driving portion engageable with the drive portion 66 formed on the member 65 carried by the coupling member or coil spring 64. The disk drive portion in the present instance is in the form of a recess 71 formed by an integral, reduced portion of the disk, said portion being protruded axially of the disk toward its integral sleeve 68. In this manner a central axially extending pocket or recess is formed in the disk member 67 and is necessarily square in order to receive the square driving portion 66 of the coupling member 64. To insure quick and easy recoupling of the drive parts when the mower is reconnected, the concave face 70 of the disk is formed with a spiral track or groove 72 extending centripetally from substantially the outer periphery of the disk face to the periphery of the square driving recess portion 71. The disk face further includes an annular flange 73 to provide the disk as a shallow pan, wherein the flange 73 serves to prevent the coupling member 66 from escaping ultimate engagement with the recess 71 in the disk, once the member 66 has contacted the face of the disk in recoupling. The driving portion 66 on the member 65 of the coupling member includes a reduced portion 74 centrally disposed at its forward end and preferably in the form of an integral semi-spherical nub engageable with the spiral groove 72. The relation between the drive disk 67 and the drive portion 66 of the member 65 is best shown in Figures 4 and 5.

Figure 3:
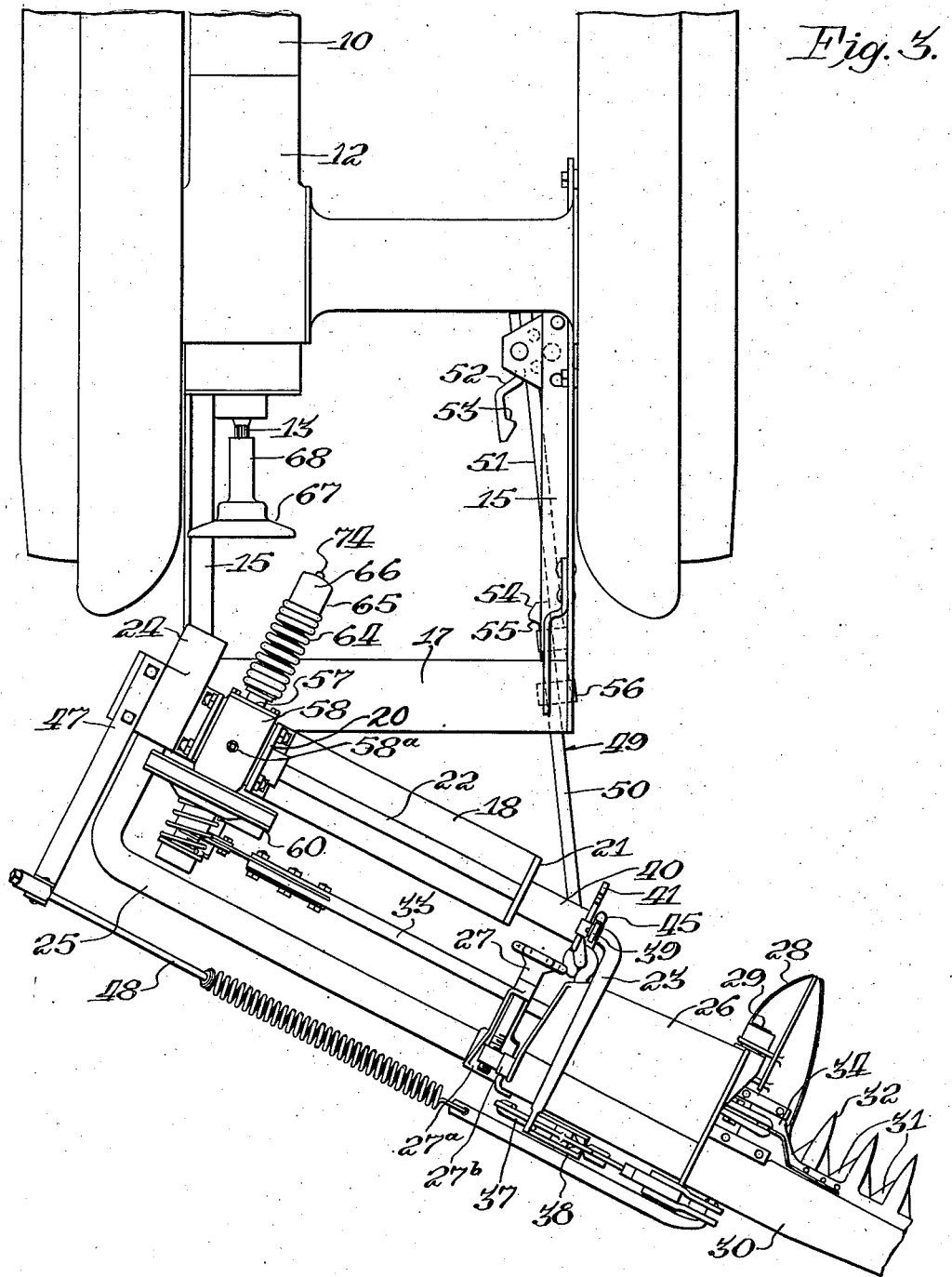
Figure 3 is a plan view showing the mower cutter bar in released position.

From the foregoing description it will be seen that the improved drive coupling means establishes a releasable, flexible driving connection between the tractor power take-off shaft 13 and the mower shaft 57, further driving connections between the shaft 57 being established through the pulley 60, belt 61, pitman eccentric 35, and pitman 33. In the particular type of mower attachment chosen for purposes of illustration herein, there is no designed vertical movement of the mower frame 18, which carries the support 20 and the tractor draw-bar 15. The only movement between the mower frame and the tractor is that rearward swinging movement of the mower horizontally when the cutter bar 30 strikes an obstruction. When the mower is thus released, the coupling means is disconnected, as best shown in Figure 3, and as will be further described later. While there is no designed relative movement vertically or transversely between the mower frame 18 and the draw-bar 17, certain relative movement may occur because of twisting strains developed during operation, causing at least temporary misalinement of the shafts 57 and 13. It will be apparent also that some misalinement of the shafts 57 and 13 may occur because of irregularity of manufacture or because of damage to some of the supporting structures. It will be appreciated that slight twisting of the draw-bar 15 will cause considerable displacement thereof with respect to the position of the power take-off shaft 13 and that this slight displacement will be reflected to a greater extent at the upper housing portion 58 of the support 20 in which the shaft 57 is journaled. An important feature of the improved drive coupling means lies in the fact that flexibility compensates for such shaft misalinement which would be otherwise incurable except perhaps by resort to expensive and complicated supporting structures and driving parts. The flexibility of the coupling member or coil spring shaft part 54 permits considerable latitude of movement without causing disconnection between the drive parts or without otherwise impairing the driving relation between the shafts 57 and 13.

The most important feature of the invention is the adaptability of the drive coupling means to automatic recoupling when the tractor and mower are reconnected after the mower has moved to released position because the cutter bar has engaged an obstruction. As previously mentioned, the releasable connection between the mower and tractor, as formed by the bars 50 and 51 of the releasable connecting means 49, permits reconnection without necessitating the operator's dismounting from the tractor seat. Recoupling of the drive coupling means is as simply and easily achieved. When the mower is swung back after striking an obstruction, as best shown in Figure 3, the drive portion 66 at the forward end of the coupling member 64 is withdrawn from the driving recess 71 in the driving disk member 67 which is carried by the tractor power take-off shaft 13. As the mower swings rearwardly about the pivot 19 on the draw-bar 15, considerable distortion of the coil spring coupling member 64 occurs, which, however, is not detrimental to the driving connection and which is easily accommodated by the particular design of driving coupling means. When the releasable connecting bars 50 and 51 are thus released and the mower is swung back to its rearmost position, driving engagement between the power take-off shaft 13 and the mower shaft 57 is, of course, interrupted. In this position of the mower, the coupling member 64 is extending forwardly toward the driving disk 67 and in a position approximately within a horizontal plane passed through the axis of the power take-off shaft 13. It is obvious, of course, that the member 64 cannot remain, while disengaged, in the same vertical plane as the power take-off shaft; although, provision may be made therefor if desired. The relation between the two shafts in disconnected position is, however, one toward substantial alinement and a return of the mower to its normal cutting position—which is effected by backing of the tractor—automatically alines the driving portion 66 of the member 64 with the driving disk 67. The diameter of the disk 67 is sufficiently large to provide association between the disk and the drive portion 66 at approximately any point within substantial alinement of said parts. It is immaterial at this point whether or not the power take-off shaft 13 is rotating. As a further aid to re-establishing the driving relation between the parts 66 and 67 and for maintaining that relation during operation of the tractor and mower, the spring 64 is normally compressed. It is apparent then that, when the mower is released and the driving connection interrupted, the spring 64 is extended forwardly. This expansion of the spring is comparatively important in reconnecting the parts in that, when the part 66 engages the concave face 70 of the disk within the annular flange or rim 73 on the disk, it is urged centrally toward the recess 71. As previously mentioned, the concave face 70 of the disk is formed with a spiral groove or track 72, which track is engaged by the integral nub 74. If the power take-off shaft is caused to be rotated while the tractor is backed toward the mower, the relation between the spiral track 72 and the nub 74 effects a quick connection between the coupling member and driving disk. If the power take-off shaft is not being operated at the time, the parts will be relatively associated in whatever positions they assume upon contact, and subsequent operation of the power take-off shaft will effect the necessary connection of the parts. In no stage of the reconnecting operation is it necessary for the operator to dismount from the tractor.

It will be readily appreciated from the foregoing description that an improved drive coupling means has been provided which achieves in a desirable manner the important objects hereinbefore set forth and which includes certain other important features and lesser objects apparent to those skilled in the art. It is within the purview of the present invention that there is provided an improved drive coupling means which consists in a flexible shaft coupling member attached at one end to either the mower or power take-off shaft, the relation between the coupling member and the shaft to which it is connected being such that, at least, a portion of the coupling member may be displaced with respect to a continuation of the axis of said shaft. The invention further contemplates inclusion of means resiliently supporting the coupling member in extended position and in substantial alinement with the other shaft to which it is to be connected. It will be further appreciated that certain alterations and modifications may be made in the preferred form of the invention illustrated without departing from the spirit and scope of the invention as defined in the appended claims.

What is claimed is:

1. For a tractor mower including a tractor having a support and a power take-off shaft at its rear, a mower connected hingedly to the support for rearward swinging movement horizontally, means embodying a releasable connection for retaining the mower in a normal transverse cutting position, and a driven shaft on the mower: a coupler separably connecting the mower shaft and the power take-off shaft in the normal cutting position of the mower, said coupler including a member movably associated at one end with one shaft and in driving engagement therewith and having means normally engageable at its other end with and completely disconnectable from the other shaft when the mower swings back, said coupler including means resiliently supporting the member in extended position in substantial alinement with the other shaft when disconnected while the mower is swung back.

2. For a tractor mower including a tractor having a support and a power take-off shaft at its rear, a mower connected hingedly to the support for rearward swinging movement horizontally, means embodying a releasable connection for retaining the mower in a normal transverse cutting position, and a driven shaft on the mower: a coupler separably connecting the mower shaft and the power take-off shaft in the normal cutting position of the mower, said coupler comprising a member carried by the power take-off shaft for rotation therewith and including an engageable portion facing the mower shaft, and a member connected to the mower shaft for rotation therewith and having a portion thereon engageable with the engageable portion on the power take-off member and completely disconnectable therefrom when the mower swings back, said coupler further including means resiliently supporting the second member in extended position directed toward the first member with the engageable portions substantially in alinement while the mower is swung back, said members being reengageable when the mower is returned to normal position.

3. For a tractor mower including a tractor having a support and a power take-off shaft at its rear, a mower connected hingedly to the support for rearward swinging movement horizontally, means embodying a releasable connection for retaining the mower in a normal transverse cutting position, and a driven shaft on the mower: a coupler separably connecting the mower shaft and the power take-off shaft in the normal cutting position of the mower, said coupler comprising a disk member driven by the power take-off shaft and having a drive portion facing the mower shaft, and a driven member connected to the mower shaft for rotation therewith and having a drive portion thereon engageable with the driving portion of the disk member and completely disconnectable therefrom when the mower swings back, said coupler further including means resiliently supporting the driven member in extended position toward the disk member with the drive portions substantially in alinement while the mower is swung back, the driven member drive portion engaging the disk and becoming automatically connected to the disk drive portion when the mower is returned to normal position.

4. For a tractor mower including a tractor having a support and a power take-off shaft at its rear, a mower connected hingedly to the support for rearward swinging movement horizontally, means embodying a releasable connection for retaining the mower in normal transverse cutting position, and a driven shaft on the mower: a coupler separably connecting the mower shaft and the power take-off shaft in the normal cutting position of the mower, said coupler comprising a disk member driven by the power take-off shaft and formed with a reduced central recess facing the mower shaft, and a driven member connected to the mower shaft for rotation therewith and having a drive portion thereon engageable with the recess in the disk member and completely disconnectable therefrom when the mower swings back, said coupler further including means resiliently supporting the driven member in extended position toward the disk member with the drive portion substantially in alinement with the recess in the disk while the mower is swung back, the driven member drive portion engaging the disk and becoming automatically engageable with the recess in the disk when the mower is returned to normal position.

5. The combination set forth in claim 4, in which the disk member is formed with a concave face including the recess and disposed toward the mower.

6. The combination set forth in claim 4, in which the driven member drive portion is reduced at its end to form a guide portion, and in which the disk member has its radial face including the recess formed with a spiral track directed from the disk periphery toward the recess and engageable by the guide portion on the driven member.

7. For a tractor mower including a tractor having a support and a power take-off shaft at its rear, a mower connected higedly to the support for rearward swinging movement horizontally, means embodying a releasable connection for retaining the mower in a normal transverse cutting position, and a driven shaft on the mower: a coupler separably connecting the mower shaft and the power take-off shaft in the normal cutting position of the mower, said coupler comprising a coil spring extending between the shafts and coiled about an axis generally extending through the shaft axes, said spring being associated at one end with one shaft for rotation therewith and engageable at its other end with the other shaft, said coil spring being completely disconnectable at said end from said other shaft when the mower swings back, said spring extending from one shaft substantially in position for recoupling with the other shaft when the mower is returned to normal position.

8. For a tractor mower including a tractor having a support and a power take-off shaft at its rear, a mower connected hingedly to the support for rearward swinging movement horizontally, means embodying a releasable connection for retaining the mower in a normal transverse cutting position, and a driven shaft on the mower: a coupler separably connecting the mower shaft to the power take-off shaft in the normal cutting position of the mower, said coupler comprising a coil spring extending between the shafts and coiled about an axis generally extending through the shaft axes, said spring being associated at one end with one shaft for rotation therewith, the other end of the spring including a drive member, a second drive member driven by the other shaft and engageable with the spring drive member and completely disconnectable therefrom when the mower swings back, the spring being normally compressed when the mower is in normal position, the spring extending from one shaft substanntially in position while the mower is swung back for recoupling of the drive members when the mower is returned to normal position.

9. For a tractor mower including a tractor having a support and a power take-off at its rear, a mower connected hingedly to the support for rearward swinging movement horizontally, means embodying a releasable connection for retaining the mower in a normal transverse cutting position, and a driven shaft on the mower: a coupler separably connecting the mower shaft to the power take-off shaft in the normal cutting position of the mower, said coupler comprising a disk driven by one shaft and having a drive portion thereon, a coil spring arranged between the shafts on an axis extending generally through the shaft axes, said spring being associated at one end with the other shaft and driven thereby and having a drive portion at its other end engageable with the disk driven portion, the spring being normally compressed along the aforesaid axis when the mower is in normal position, the drive portions being completely disconnectable when the mower swings back, the spring expanding along its axis and extending from one shaft substantially in position for recoupling with the disk drive portion when the mower is returned to normal position.

10. For a tractor mower including a tractor having a support and a power take-off at its rear, a mower connected hingedly to the support for rearward swinging movement horizontally, means embodying a releasable connection for retaining the mower in a normal transverse cutting position, and a driven shaft on the mower: a coupler separably connecting the mower shaft to the power take-off shaft in the normal cutting position of the mower, said coupler comprising a disk driven by one shaft and having a central reduced recess thereon, a coil spring associated at one end with the other shaft and driven thereby and having a drive portion at its other end engageable with the recess in the disk, the spring being normally compressed when the mower is in normal position, the drive portion being completely disconnectable from the recess when the mower swings back, the spring expanding and retaining its drive portion substantially in alinement with the disk recess for recoupling of same when the mower is returned to normal position.

11. The combination set forth in claim 10, in which the disk member is formed with a concave face including the recess and disposed toward the spring drive portion.

12. The combination set forth in claim 10, in which the spring drive portion is reduced to form a guide portion, and in which the disk member has its radial face including the recess and formed with a spiral track moving substantially from the disk periphery toward the recess and engageable by the guide portion.

13. The combination set forth in claim 10, in which the disk is formed with an annular rim extending toward the spring drive portion and a concave radial face including the recess, said face being formed with a spiral track moving from the rim to the recess, and in which the spring drive portion is reduced to form a guide portion engageable with the spiral track in the disk.

14. For a tractor mower including a tractor having a support and a power take-off shaft at its rear, a mower connected hingedly to the support for rearward swinging movement horizontally, means embodying a releasable connection for retaining the mower in a normal transverse cutting position, and a driven shaft on the mower: a coupler separably connecting the shaft to the power take-off in the normal cutting position of the mower, said coupler having means attaching it at one end to one shaft for rotation with that shaft but movable at least laterally with respect to said shaft substantially about its attaching means, the coupler at its other end having means disconnectably associating the coupler with the other shaft while the mower is in normal position, the coupler at said end being completely disconnectable from said shaft when the mower swings back, said coupler including means resiliently holding same in substantially alined position against the aforesaid lateral movement, and means for automatically guiding the coupler into reengagement with said other shaft when the mower is returned to normal position.

15. For a tractor mower including a tractor having a power take-off shaft, and a mower connected to the tractor and having cutting mechanism and drive means therefor: a drive shaft including a spring torque-transmitting portion and a coupler comprising interconnected and separable elements providing a releasable driving connection between the drive means and the power take-off shaft.

16. For a tractor mower including a tractor having a power take-off shaft carrying a drive coupling part, and a mower connected to the tractor and having cutting mechanism and drive means therefor: a drive shaft including a resilient torque-transmitting portion and having a coupler part, said coupler part being releasably interconnected with the drive coupling part of the power take-off shaft to provide a releasable driving connection between the drive means and the power take-off shaft.

17. For a tractor mower including a tractor having a power take-off shaft, and a mower connected to the tractor for hinging movement horizontally rearwardly about a vertical axis and having driven parts: a shaft connected to the power take-off shaft for driving said parts and having a resilient torque-transmitting portion, said shaft being disconnectible from the power take-off shaft when the mower moves rearwardly, said resilient portion holding the shaft in position for reconnection to the power take-off shaft.

RAYMORE D. MacDONALD.